US012173610B2

(12) United States Patent
Jaramillo et al.

(10) Patent No.: US 12,173,610 B2
(45) Date of Patent: Dec. 24, 2024

(54) SYSTEM FOR COUPLING DUCTS IN GAS TURBINE ENGINES FOR POWER GENERATION APPLICATIONS

(71) Applicant: Solar Turbines Incorporated, San Diego, CA (US)

(72) Inventors: Jennifer Lynn Jaramillo, San Diego, CA (US); Manikandan Govindan, Karur (IN); Sindhu Penna, Bangalore (IN); William Courtney Krehbiel, California, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/171,400

(22) Filed: Feb. 20, 2023

(65) Prior Publication Data

US 2024/0280034 A1 Aug. 22, 2024

(51) Int. Cl.
*F01D 25/24* (2006.01)
*F01D 11/00* (2006.01)

(52) U.S. Cl.
CPC .......... *F01D 25/243* (2013.01); *F01D 11/005* (2013.01); *F05D 2220/32* (2013.01); *F05D 2260/36* (2013.01)

(58) Field of Classification Search
CPC ...... F01D 25/24; F01D 25/243; F01D 25/246; F01D 25/28; F01D 25/30; F01D 11/02; F02C 7/08; F02C 7/04; F02K 3/00; F02K 3/02; F02K 3/025; F02K 3/04; F05D 2260/36; F16L 23/00; F16L 23/024; F16L 23/028; F16L 23/0283; F16L 23/032; F16L 23/036
See application file for complete search history.

(56) References Cited

U.S. PATENT DOCUMENTS

| | | | | |
|---|---|---|---|---|
| 4,648,790 | A | 3/1987 | Horler | |
| 10,570,810 | B2 * | 2/2020 | Tsukiyama | F02B 37/004 |
| 2016/0341663 | A1 * | 11/2016 | Avouris | G01N 21/554 |
| 2017/0114654 | A1 * | 4/2017 | Pakkala | F02C 3/04 |
| 2019/0226360 | A1 * | 7/2019 | Santais | F01D 25/243 |
| 2020/0072054 | A1 * | 3/2020 | Laroche | F01D 5/026 |
| 2020/0149473 | A1 * | 5/2020 | Biehler | F02C 7/04 |

FOREIGN PATENT DOCUMENTS

| | | | | |
|---|---|---|---|---|
| FR | 3103209 B1 | | 5/2022 | |
| KR | 10-1813762 B1 | | 12/2017 | |
| WO | WO-2017074407 A1 | * | 5/2017 | F01D 25/005 |

* cited by examiner

*Primary Examiner* — David E Sosnowski
*Assistant Examiner* — Maxime M Adjagbe

(57) ABSTRACT

A system for coupling a first duct to a second duct configured for a gas flow with a gas turbine engine is disclosed. The system includes a first closed member and a second closed member. The first closed member is fixedly coupled to the first duct and defines an engagement surface. The second closed member is fixedly coupled to the second duct and defines a mating surface complementary to the engagement surface. The coupling of the first duct to the second duct includes one of the engagement surface and the mating surface complementarily receiving the other of the engagement surface and the mating surface such that a labyrinth interface is defined therebetween. Also, the first duct is sealed with respect to the second duct at the labyrinth interface such that a seepage of some of the gas flow through the labyrinth interface is restricted.

15 Claims, 7 Drawing Sheets

SYSTEM FOR COUPLING DUCTS IN GAS TURBINE ENGINES FOR POWER GENERATION APPLICATIONS

TECHNICAL FIELD

The present disclosure relates to systems for coupling ducts together. For example, the present disclosure relates to a system for coupling a first duct to a second duct in a gas turbine engine for a power generation system.

BACKGROUND

Gas turbine engines are typically coupled with and/or include multiple duct assemblies, such as an inlet duct assembly and an exhaust duct assembly. An inlet duct assembly may be used for receiving and routing ambient air from an outside environment into the gas turbine engine to help achieve combustion within the gas turbine engine and an exhaust duct assembly may be used for discharging exhaust gases released from the combustion to the outside environment.

In certain scenarios, the exhaust duct assembly may be coupled to other devices or ducts. For example, in the case of power systems using the gas turbine engine for power generation, an exhaust duct assembly may be coupled to devices, such as a silencer, and/or the like, such that exhaust gases from the gas turbine engine can be routed to such devices prior to its release to the outside environment. A coupling (and decoupling) of the exhaust duct assembly to such devices or ducts is a cumbersome and time-consuming task.

French Patent No. 3103209 B1 discloses a labyrinth seal for a turbine engine. The labyrinth seal includes a support fixed to a casing of the turbine engine. Also, the labyrinth seal includes an abradable element mounted to the support. The abradable element includes one or more grooves configured to cooperate with one or more wipers of a rotor element of the turbine engine.

SUMMARY OF THE INVENTION

In an aspect, the present disclosure relates to a system for coupling a first duct to a second duct. The second duct is configured for a gas flow with a gas turbine engine. The system includes a first closed member and a second closed member. The first closed member is configured to be fixedly coupled to the first duct. In addition, the first closed member defines an engagement surface. The second closed member is configured to be fixedly coupled to the second duct. The second closed member defines a mating surface complementary to the engagement surface. The coupling of the first duct to the second duct includes one of the engagement surface and the mating surface complementarily receiving the other of the engagement surface and the mating surface such that a labyrinth interface is defined therebetween and such that the first closed member and the second closed member together define a passage for at least a portion of the gas flow to pass between the second duct and the first duct. Also, at least in part, the first duct is sealed with respect to the second duct at the labyrinth interface such that a seepage of some of the gas flow out of the passage through the labyrinth interface is restricted.

In another aspect, the present disclosure is directed to a duct assembly for a gas turbine engine. The duct assembly includes a first duct and a second duct configured for gas flow with the gas turbine engine. Also, the duct assembly includes a system for coupling the first duct to the second duct. The system includes a first closed member and a second closed member. The first closed member is configured to be fixedly coupled to the first duct. In addition, the first closed member defines an engagement surface. The second closed member is configured to be fixedly coupled to the second duct. The second closed member defines a mating surface complementary to the engagement surface. The coupling of the first duct to the second duct includes one of the engagement surface and the mating surface complementarily receiving the other of the engagement surface and the mating surface such that a labyrinth interface is defined therebetween and such that the first closed member and the second closed member together define a passage for at least a portion of the gas flow to pass between the second duct and the first duct. Also, at least in part, the first duct is sealed with respect to the second duct at the labyrinth interface such that a seepage of some of the gas flow out of the passage through the labyrinth interface is restricted.

In yet another aspect, the present disclosure relates to a power generation system. The power generation system includes a generator, a gas turbine engine, and a duct assembly. The generator is configured to generate electrical power. The gas turbine engine is configured to drive the generator for generating the electrical power. The duct assembly is in fluid communication with the gas turbine engine. The duct assembly includes a first duct and a second duct configured for gas flow with the gas turbine engine. Also, the duct assembly includes a system for coupling the first duct to the second duct. The system includes a first closed member and a second closed member. The first closed member is configured to be fixedly coupled to the first duct. In addition, the first closed member defines an engagement surface. The second closed member is configured to be fixedly coupled to the second duct. The second closed member defines a mating surface complementary to the engagement surface. The coupling of the first duct to the second duct includes one of the engagement surface and the mating surface complementarily receiving the other of the engagement surface and the mating surface such that a labyrinth interface is defined therebetween and such that the first closed member and the second closed member together define a passage for at least a portion of the gas flow to pass between the second duct and the first duct. Also, at least in part, the first duct is sealed with respect to the second duct at the labyrinth interface such that a seepage of some of the gas flow out of the passage through the labyrinth interface is restricted.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1', 101 and 201 could refer to one or more comparable components used in the same and/or different depicted embodiments.

Figure 1:
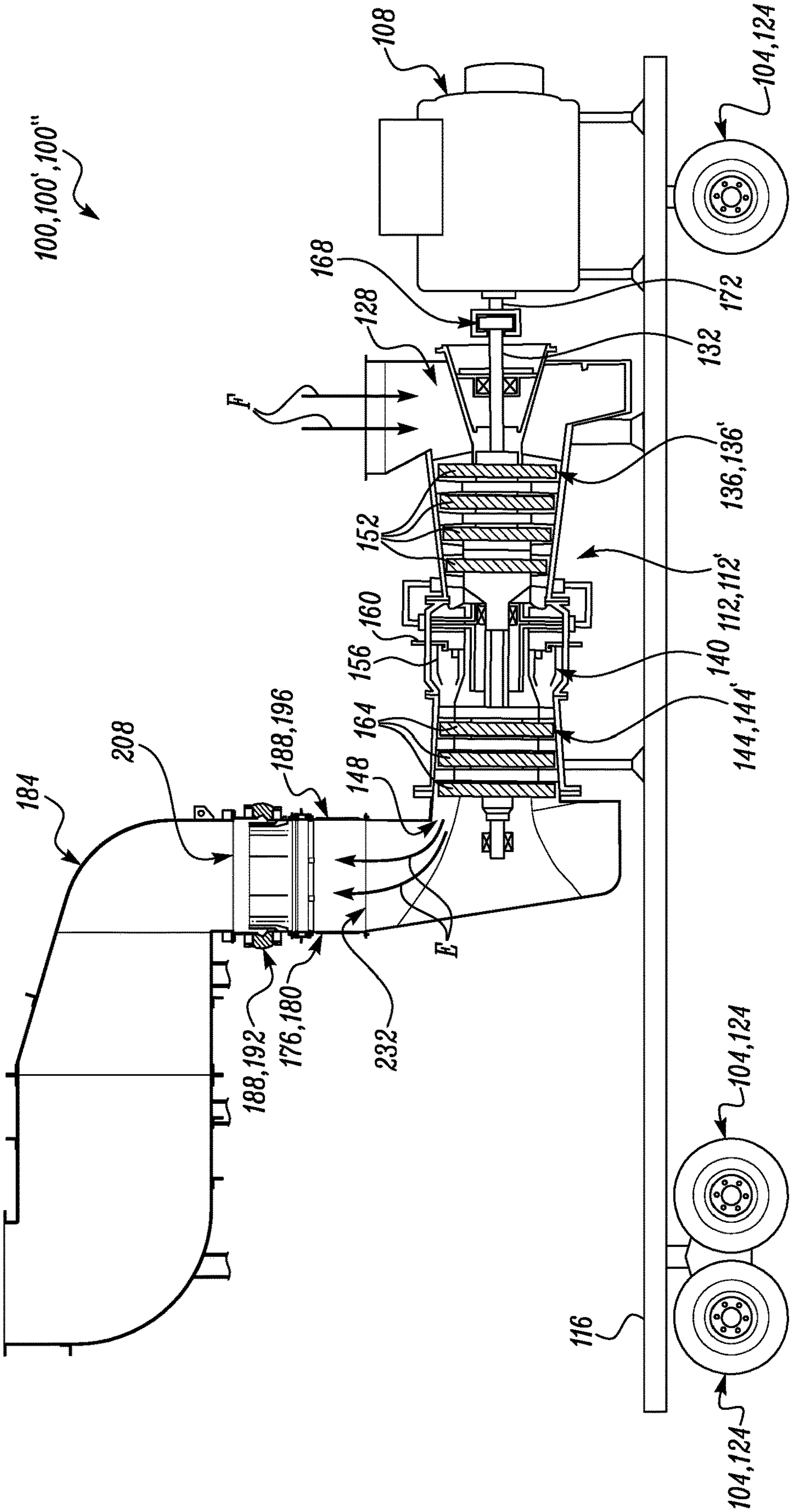
FIG. 1 illustrates a side cross-sectional view of a power generation system, specifically a mobile power generation system, having a gas turbine engine and a duct assembly located downstream of the gas turbine engine with respect to a gas flow into the gas turbine engine, in accordance with an embodiment of the present disclosure.

Referring to FIG. 1, an exemplary power generation system 100 is shown. The power generation system 100 may include a mobile power generation system 100' that may be provided at locations, e.g., where supplementary electrical power may be needed, at times of peak demand or brownout in a distribution grid or network, in an emergency or other problem in the distribution grid, or other type of events. In the present embodiment, the mobile power generation system 100' is embodied as a wheel-mounted power generator 100' configured to be transported to locations where it can be assembled and/or deployed to provide electrical power to one or more electrical grids, commercial or domestic establishments, one or more electrical/electronic devices, and/or the like recipients, available at those locations. Non-mobile power generation systems are likewise contemplated and, unless clearly indicated otherwise or as may be apparent from context, any discussion of a mobile power generation system 100 is equally applicable to a non-mobile power generation system.

The power generation system 100 may include a plurality of ground engaging members 104, a generator 108, and a power source 112. The power generation system 100 may also include a base platform 116 which may support the generator 108 and the power source 112, although other known components may be supported by the base platform 116, as well. In general, the power generation system 100 may include an enclosure to enclose the generator 108 and the power source 112—however, such an enclosure is omitted in the present disclosure to clearly illustrate details of the generator 108, the power source 112, and other systems or components that may be housed within the enclosure.

The ground engaging members 104 may support the base platform 116, and thus the generator 108 and the power source 112 over the ground. The ground engaging members 104 may facilitate transportation of the power generation system 100 with respect to the ground such that the power generation system 100 can be transported from one location to another location.

In the present exemplary embodiment, the ground engaging members 104 include wheels 124. The generator 108 may be configured to be driven by the power source 112 to generate the electrical power.

The power source 112 may include a gas turbine engine 112' which may be configured to power the generator 108, typically by combusting one or more fuels, such as natural gas, biodiesel, propane, diesel, gasoline, etc. The gas turbine engine 112' may include an inlet passage 128, a shaft 132, a compressor 136, a combustor 140, a turbine 144, and an exhaust passage 148. The inlet passage 128 may direct working fluid F (e.g., ambient air) towards the compressor 136. The compressor 136 may be in fluid communication with the inlet passage 128 to receive the working fluid F from the inlet passage 128. The compressor 136 may compress the working fluid F passing therethrough to generate a compressed working fluid to be supplied to the combustor 140. In the exemplary embodiment, as shown in FIG. 1, the compressor 136 is an axial flow compressor 136' that includes a series of rotating blades 152 mounted on the shaft 132 of the gas turbine engine 112'. In other embodiments, the compressor 136 may be a radial flow compressor.

The combustor 140 may be in fluid communication with the compressor 136 to receive the compressed working fluid from the compressor 136. The combustor 140 may facilitate mixing the compressed working fluid with fuel and combusting the mixture of the compressed working fluid and the fuel to generate combustion gases at high pressure and temperature. In the exemplary embodiment, as shown in FIG. 1, the combustor 140 includes combustion chambers 156, each having one or more fuel injectors 160 for supplying fuel to be mixed with the compressed working fluid, and one or more ignition devices (not shown) for igniting the mixture of the compressed working fluid and the fuel to generate the combustion gases.

The turbine 144 may be mechanically coupled to the shaft 132. In the exemplary embodiment, as shown in FIG. 1, the turbine 144 is an axial flow turbine 144' that includes a series of rotor assemblies 164 mounted on the shaft 132. Also, the turbine 144 may be in fluid communication with the combustor 140 to receive the combustion gases released from the combustor 140 and allow the combustion gases to flow therethrough. The combustion gases flowing through the turbine 144 may drive the rotor assemblies 164, thereby causing the shaft 132 to rotate and generate motive power (i.e., mechanical power) to be transmitted to the generator 108, for example, via a coupling 168 between the shaft 132 and an input shaft 172 of the generator 108.

The exhaust passage 148 may be in fluid communication with the turbine 144 to receive a flow of the combustion gases exhausted (hereinafter referred to as "exhaust gas flow E") from the turbine 144. Also, the exhaust passage 148 may be configured to direct the exhaust gas flow E received from the turbine 144 either towards the outside environment or towards one or more exhaust treatment units, such as an exhaust silencer unit 184 located downstream of the exhaust passage 148.

Further, the power generation system 100 includes a duct assembly 176. The duct assembly 176 is in fluid communication with the gas turbine engine 112' to facilitate outflow of fluid (e.g., the working fluid F, exhaust gas flow E, etc.) from the gas turbine engine 112'. The duct assembly 176 includes an exhaust duct assembly 180 disposed downstream of the gas turbine engine 112' and configured to be in fluid communication with the exhaust passage 148 of the gas turbine engine 112' to receive the exhaust gas flow E from the exhaust passage 148. In addition, the exhaust duct assembly 180 is configured to direct the exhaust gas flow E either towards the outside environment or towards the exhaust silencer unit 184.

Figure 2:
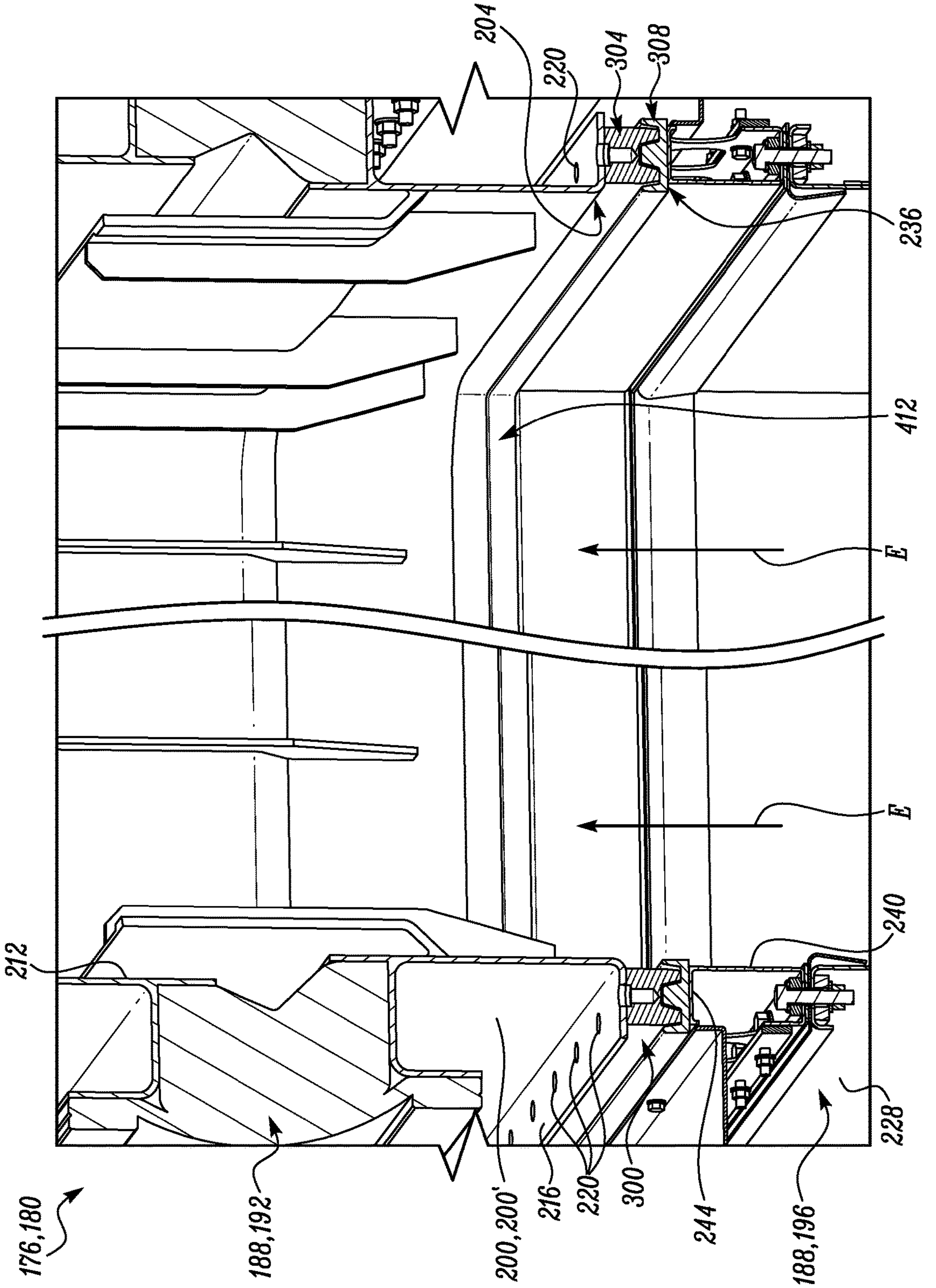
FIG. 2 illustrates a sectional perspective view of the duct assembly, of FIG. 1, including first and second ducts, and a system for coupling the first duct to the second duct, in accordance with an embodiment of the present disclosure.

Referring to FIG. 2, the duct assembly 176 includes ducts 188, i.e.,—a first duct 192 and a second duct 196. The first duct 192 may include a first hollow elongated tubular body 200. The first hollow elongated tubular body 200 may define an inlet end 204, an outlet end 208 (shown in FIG. 1), and a first wall 212. The inlet end 204 facilitates introduction of the gas flow (i.e., the exhaust gas flow E) from the second duct 196 into the first duct 192. The outlet end 208 may be disposed spaced apart from the inlet end 204 along a length of the first hollow elongated tubular body 200. The outlet end 208 facilitates discharge of the gas flow (i.e., the exhaust gas flow E) from the first duct 192. The first wall 212 may extend between the inlet end 204 and the outlet end 208. Also, the first hollow elongated tubular body 200 may define a first flange portion 216 at the inlet end 204. The first flange portion 216 may extend radially outward relative to a direction extending from the inlet end 204 towards the outlet end 208. The first flange portion 216 may include a plurality of mounting-bores 220.

The second duct 196 may include a second hollow elongated tubular body 228. The second hollow elongated tubular body 228 may define an inlet end 232 (shown in FIG. 1), an outlet end 236, and a second wall 240. The inlet end 232 facilitates introduction of the gas flow (i.e., the exhaust gas flow E) from the exhaust passage 148 of the gas turbine engine 112' into the second duct 196. The outlet end 236 may be disposed spaced apart from the inlet end 232 along a length of the second duct 196. The outlet end 236 facilitates discharge of the gas flow (i.e., the exhaust gas flow E) from the second duct 196 into the first duct 192. The second wall 240 may extend between the inlet end 232 and the outlet end 236. Also, the second hollow elongated tubular body 228 may define a second flange portion 244 at the outlet end 236. The second flange portion 244 may extend radially outward relative to a direction extending from the inlet end 232 towards the outlet end 236.

Figure 3:
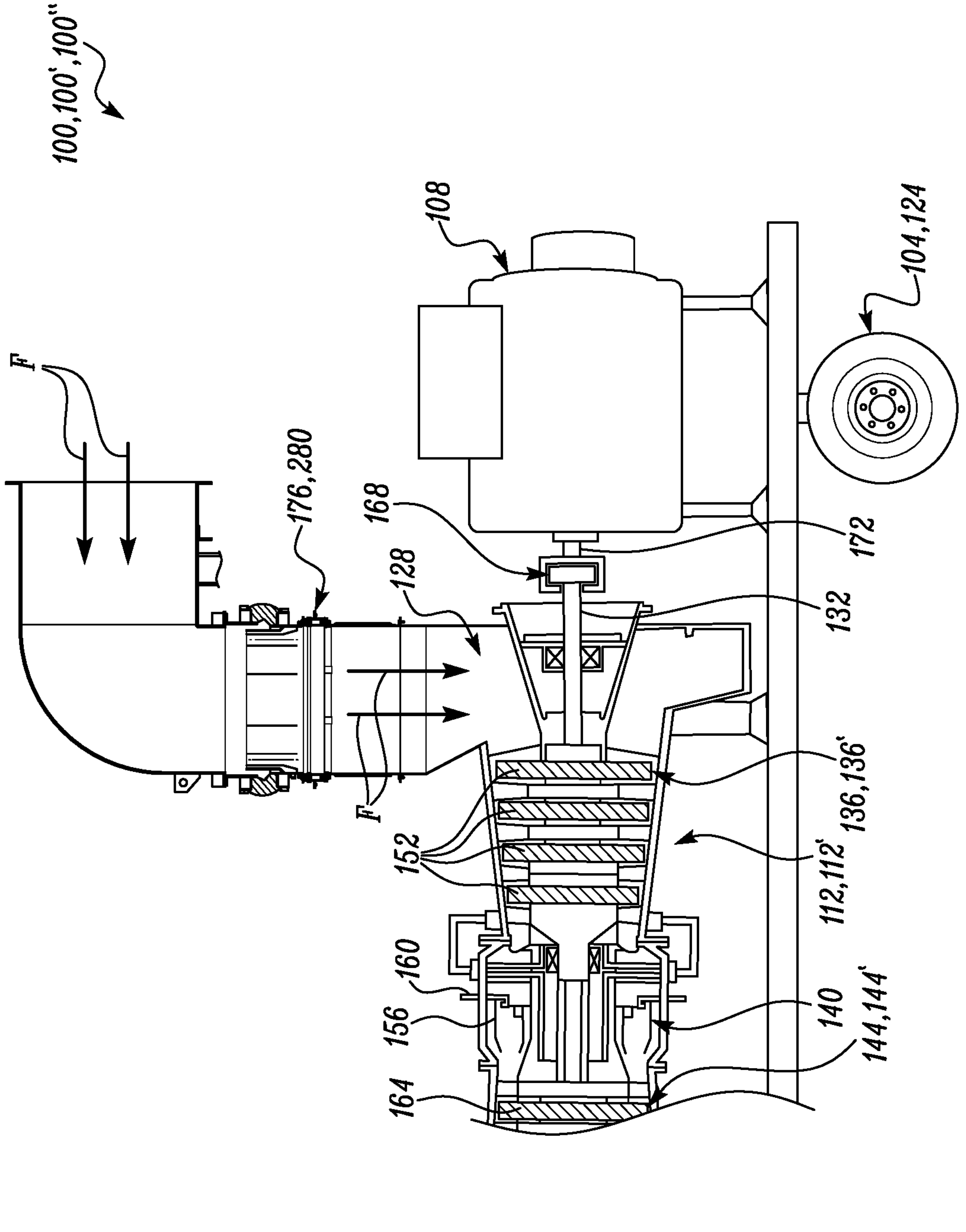
FIG. 3 illustrates a side cross-sectional view of the power generation system having a duct assembly located upstream of the gas turbine engine with respect to the gas flow into the gas turbine engine, in accordance with another embodiment of the present disclosure.

In another embodiment, as shown in FIG. 3, the duct assembly 176 includes an inlet duct assembly 280. The inlet duct assembly 280 may be in fluid communication with the inlet passage 128 of the gas turbine engine 112'. Also, the inlet duct assembly 280 may be disposed upstream of the inlet passage 128 with respect to the gas flow (e.g., the working fluid F) into the gas turbine engine 112' to direct the working fluid F from the outside environment into the gas turbine engine 112'. The inlet duct assembly 280 may be similar to the exhaust duct assembly 180 in construction and configuration, and hence will not be further discussed.

In yet another embodiment, the power generation system 100 may include more than one duct assembly 176, for example two duct assemblies 176, with one duct assembly 176 being in fluid communication with the inlet passage 128 of the gas turbine engine 112' and the other duct assembly 176 being in fluid communication with the exhaust passage 148 of the gas turbine engine 112'.

During the installation of the power generation system 100 at a location or a site, the ducts 188 (e.g., first duct 192 and the second duct 196 of the exhaust duct assembly 180) are to be coupled to each other. To couple and seal the first duct 192 with respect to the second duct 196, in one or more aspects of the present disclosure, a system 300 is disclosed. The system 300 includes a first closed member 304 and a second closed member 308. According to an exemplary embodiment, the term “closed member” may refer to an annular member with a continuous body (such as, a toroid), whether formed from a single integral structure or from multiple components that are joined together to form a toroid. For example, the letter “O” is a closed member, and the letter “C” is not a closed member. It should be noted that the term “annular” is not restricted to circular or toroidal shape, but may also include any non-circular shape such as rectangular, triangular, etc.

Details related to each of the first closed member 304 and the second closed member 308 is now discussed.

Figure 4:
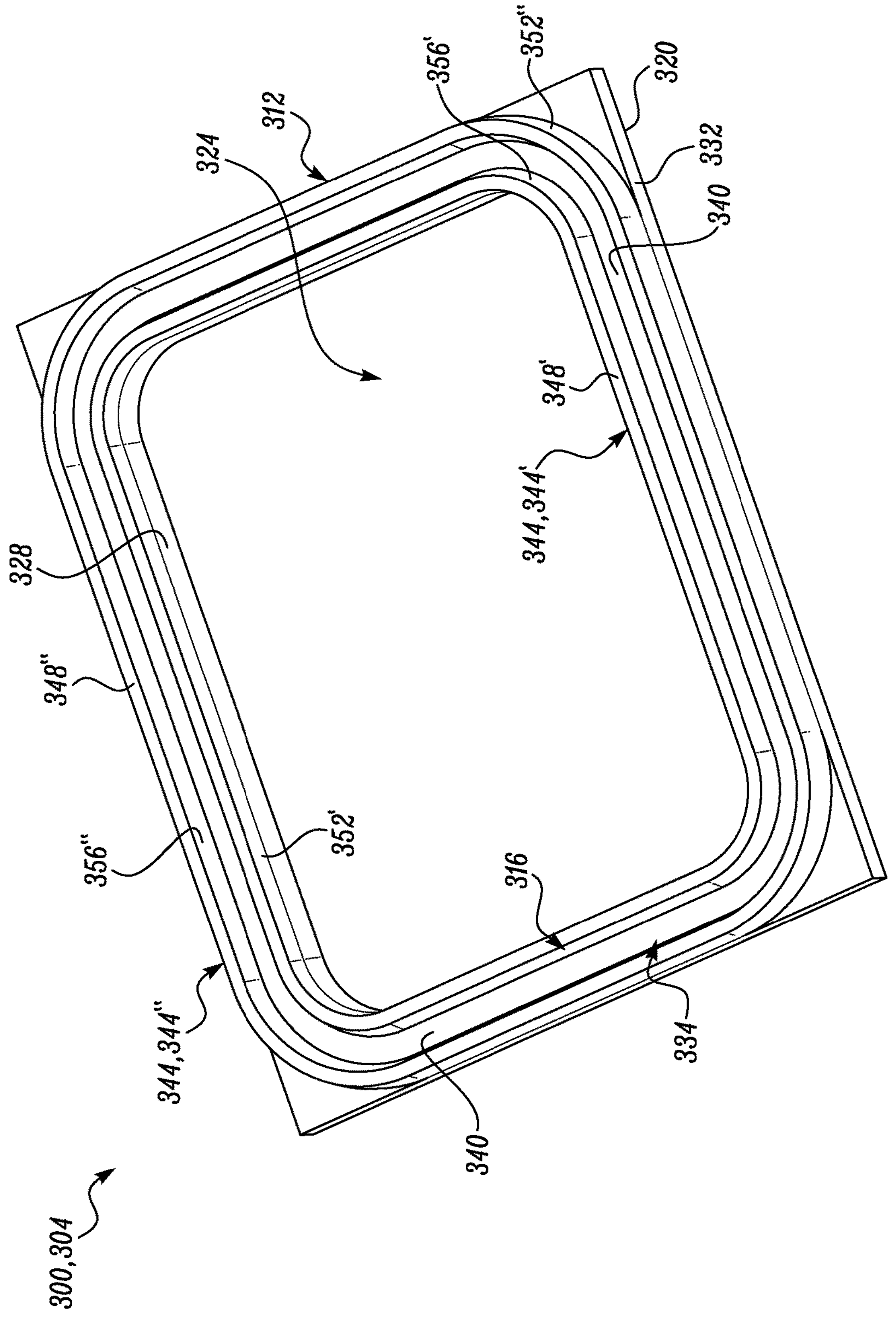
FIG. 4 illustrates a perspective view of a first closed member of the system, in accordance with an embodiment of the present disclosure.
Figure 6:
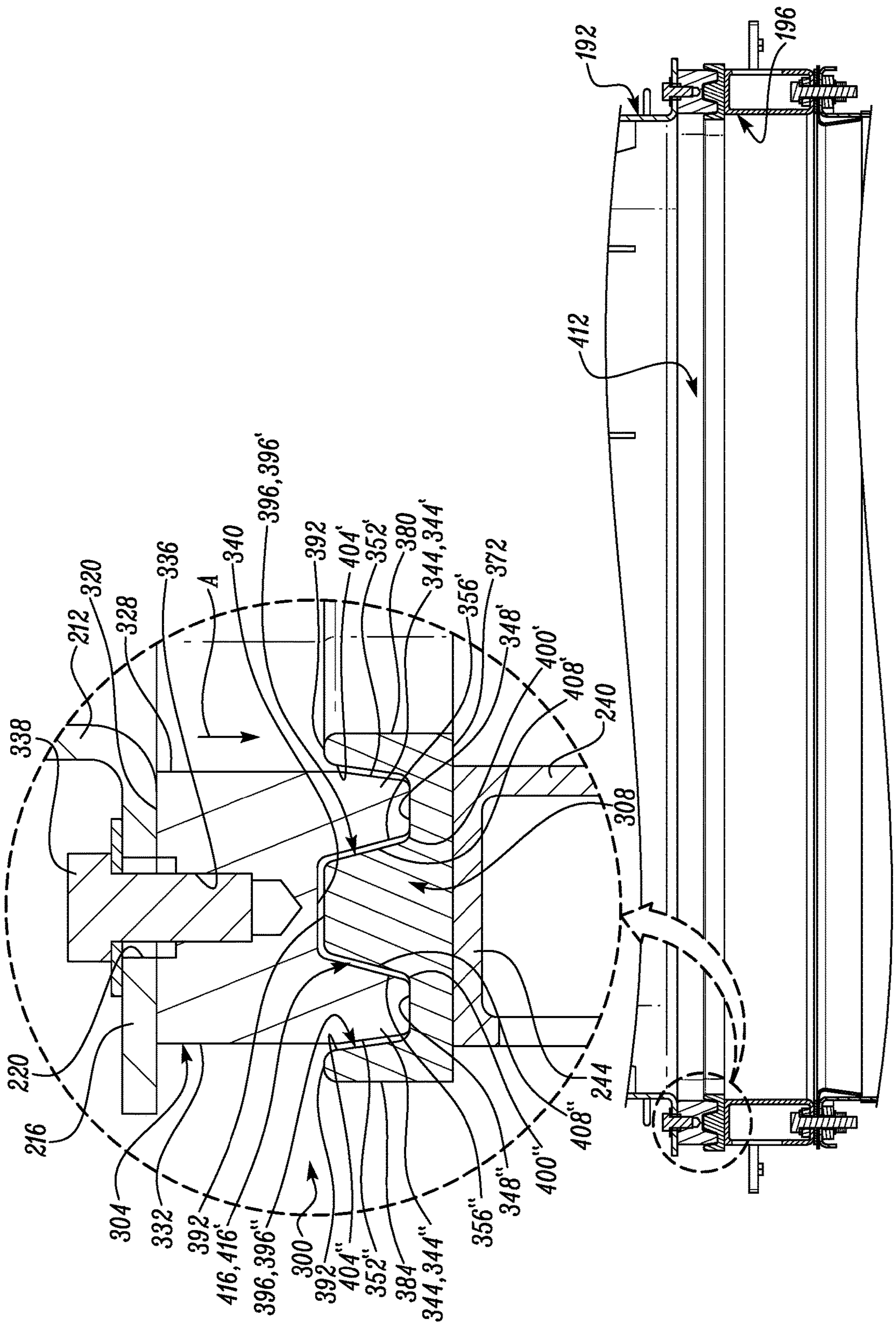
FIGS. 6 and 7 are side cross-sectional views that illustrate coupling and sealing of the first duct with respect to the second duct, in accordance with an embodiment of the present disclosure.

Referring to FIG. 4, the first closed member 304 includes a body 312 and an engagement surface 316. The body 312 may be made of stainless steel. The body 312 may define a first base surface 320 configured to abut against the first flange portion 216 to couple the first closed member 304 to the inlet end 204 of the first duct 192. Also, the body 312 may define an aperture 324, an inner periphery 328 extending around the aperture 324, and an outer periphery 332 extending around the inner periphery 328 to define a path 334 (e.g., an annular path 334). In addition, the body 312 may define a plurality of blind-holes 336 (only one blind-hole 336 is shown in FIG. 6) equidistantly spaced and arrayed along the path 334 of the body 312. The blind-holes 336 may correspondingly receive fasteners (e.g., a fastener 338 received within the blind-hole 336 as shown in FIG. 6) to enable the first closed member 304 to be fixedly coupled to the first duct 192. In the present embodiment, the body 312 has a substantially closed rectangular shape that matches (e.g., in shape and size) with the inlet end 204 of the first duct 192.

In an assembly of the first closed member 304 to the first duct 192, the first base surface 320 may be abutted against the first flange portion 216 such that the blind-holes 336 are aligned with their corresponding mounting-bores 220 of the first flange portion 216. Further, in the assembly of the first closed member 304 to the first duct 192, the fasteners 338 may be received within the corresponding blind-holes 336 and the mounting-bores 220, and may be fastened or bolted to couple the first closed member 304 to the inlet end 204 of the first duct 192. In that manner, the first closed member 304 is fixedly coupled to the first duct 192. In some embodiments, a gasket (not shown) may be disposed between the first base surface 320 and the first flange portion 216. In other embodiments, the first closed member 304 may be welded to the first flange portion 216 of the first duct 192.

The engagement surface 316 may be defined by a first surface 340 and one or more protruded portions 344. The first surface 340 may extend substantially parallel to the first base surface 320. The protruded portions 344 are defined throughout the path 334 of the body 312 (or the first closed member 304). In the exemplary embodiment, as shown in FIG. 4, the body 312 defines two protruded portions 344, namely a first protruded portion 344' and a second protruded portion 344' disposed spaced apart from the first protruded portion 344' along a plane substantially parallel to the first surface 340. In other embodiments, lesser or higher numbers of the protruded portions 344 may be defined at the body 312.

The first protruded portion 344' may extend outwardly from the first surface 340 along a direction extending from the first base surface 320 towards the first surface 340. The first protruded portion 344' may extend outwardly from the first surface 340 to define a first axial end surface 348'. The first axial end surface 348' may extend parallel to the first surface 340. Further, the first protruded portion 344' may define a pair of first sidewalls 352', 356'. The first sidewall 352' may extend between the inner periphery 328 and the first axial end surface 348', whereas the first sidewall 356' may extend between the first surface 340 and the first axial end surface 348'. Further, as shown in FIG. 6, the first sidewalls 352', 356' are tapered and converge towards each other as they extend outwardly away from the first surface 340. In another embodiment, the first sidewalls 352', 356' may be tapered and diverge away from each other as they extend outwardly away from the first surface 340. In yet another embodiment, the first sidewalls 352', 356' may be parallel to each other as they extend outwardly away from the first surface 340.

Similarly, the second protruded portion 344' may extend outwardly from the first surface 340 along the direction extending from the first base surface 320 towards the first surface 340. The second protruded portion 344' may extend outwardly from the first surface 340 to define a second axial end surface 348". The second axial end surface 348' may extend parallel to the first surface 340. Further, the second protruded portion 344' may define a pair of first sidewalls 352", 356". The first sidewall 352' may extend between the outer periphery 332 and the second axial end surface 348", whereas the first sidewall 356' may extend between the first surface 340 and the second axial end surface 348". Further, as shown in FIG. 6, the first sidewalls 352", 356' are tapered and converge towards each other as they extend outwardly away from the first surface 340. In another embodiment, the first sidewalls 352", 356' may be tapered and diverge away from each other as they extend outwardly away from the first surface 340. In yet another embodiment, the first sidewalls 352", 356' may be parallel to each other as they extend outwardly away from the first surface 340.

Figure 5:
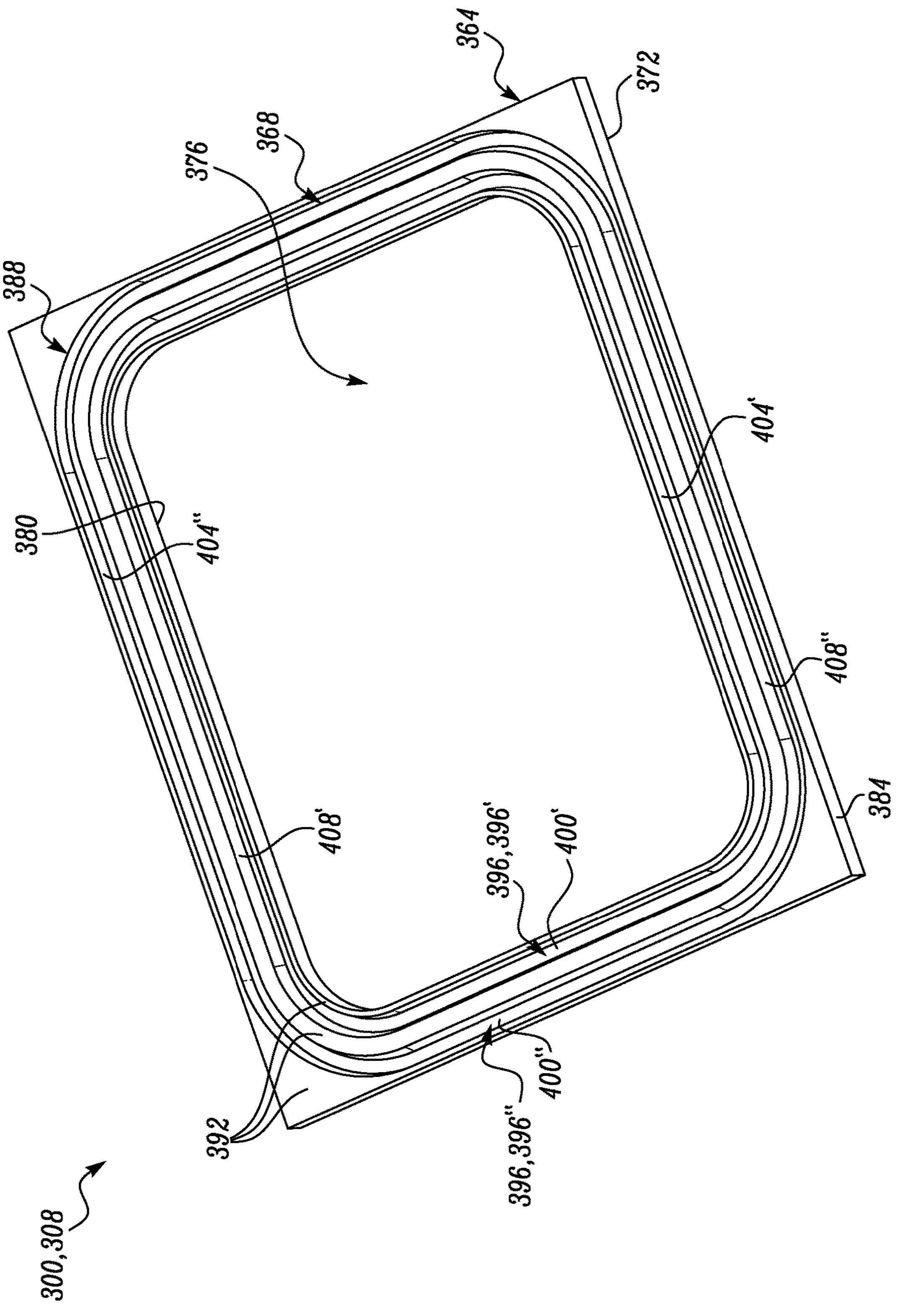
FIG. 5 illustrates a perspective view of a second closed member of the system, in accordance with an embodiment of the present disclosure.

Referring to FIG. 5, the second closed member 308 includes a body 364 and a mating surface 368. The body 364 may be made of stainless steel. The body 364 may define a second base surface 372 configured to abut against the second flange portion 244 to couple the second closed member 308 to the outlet end 236 of the second duct 196. Also, the body 364 may define an opening 376, an interior periphery 380 extending around the opening 376, and an exterior periphery 384 extending around the interior periphery 380 to define a path 388 (e.g., an annular path 388). In the present embodiment, the body 364 has a substantially closed rectangular shape that matches (e.g., in shape and size) with the outlet end 236 of the second duct 196.

In an assembly of the second closed member 308 to the second duct 196, the second base surface 372 may be abutted against the second flange portion 244 (at the outlet end 236 of the second duct 196) and welded to the second flange portion 244 to fixedly couple the second closed member 308 to the second duct 196. In other embodiments, the second closed member 308 may be coupled to the second duct 196 via any suitable fastening mechanisms known in the art. In some embodiments, a gasket (not shown) may be disposed between the second base surface 372 and the second flange portion 244 prior to assembling the second closed member 308 to the second duct 196.

For coupling the first duct 192 to the second duct 196, the mating surface 368 of the second closed member 308 and the engagement surface 316 of the first closed member 304 may be in engagement with each other. Therefore, the mating surface 368 may include a profile complementary to a profile of the engagement surface 316. Accordingly, the mating surface 368 may be defined by the second surface 392 and one or more grooves 396. The second surface 392 may extend substantially parallel to the second base surface 372. The grooves 396 are defined throughout the path 388 of the body 364 (or the second closed member 308). In the exemplary embodiment, as shown in FIG. 5, the body 364 defines two grooves 396, namely a first groove 396' and a second groove 396' disposed spaced apart from the first groove 396' along a plane substantially parallel to the second surface 392. In other embodiments, lesser or higher numbers of the grooves 396 may be defined at the body 364.

The first groove 396' may extend inwardly from the second surface 392 into the body 364 of the second closed member 308 to define a first bottom surface 400'. The first bottom surface 400' may extend substantially parallel to the second surface 392. Further, the first groove 396' may define a pair of second sidewalls 404', 408'. The second sidewall 404' may extend between the first bottom surface 400' and a portion of the second surface 392 disposed relatively proximal to the interior periphery 380 of the second closed member 308. The second sidewall 408' may extend between the first bottom surface 400' and a portion of the second surface 392 disposed relatively distal from the interior periphery 380 of the second closed member 308.

Further, as shown in FIG. 6, the second sidewalls 404', 408' are tapered and converge towards each other as they extend inwardly from the second surface 392 towards the first bottom surface 400'. The tapered second sidewalls 404', 408' may facilitate alignment of the first protruded portion 344' of the first closed member 304 with the first groove 396' of the second closed member 308. In another embodiment, the second sidewalls 404', 408' may be tapered and diverge away from each other as they extend inwardly from the second surface 392 towards the first bottom surface 400'. In yet another embodiment, the second sidewalls 404', 408' may be parallel to each other.

Similarly, the second groove 396' may extend inwardly from the second surface 392 into the body 364 of the second closed member 308 to define a second bottom surface 400". The second bottom surface 400' may extend parallel to the second surface 392. Further, the second groove 396' may define a pair of second sidewalls 404", 408". The second sidewall 404" may extend between the second bottom surface 400' and a portion of the second surface 392 disposed relatively proximal to the exterior periphery 384 of the second closed member 308. The second sidewall 408' may extend between the second bottom surface 400' and a portion of the second surface 392 disposed relatively distal from the exterior periphery 384 of the second closed member 308.

Further, as shown in FIG. 6, the second sidewalls 404", 408' are tapered and converge towards each other as they extend inwardly from the second surface 392 towards the second bottom surface 400". The tapered second sidewalls 404", 408' may facilitate alignment of the second protruded portion 344' of the first closed member 304 with the second groove 396' of the second closed member 308. In another embodiment, the second sidewalls 404", 408' may be tapered and diverge away from each other as they extend inwardly from the second surface 392 towards the second bottom surface 400". In yet another embodiment, the second sidewalls 404", 408' may be parallel to each other.

In the coupling of the first duct 192 to the second duct 196, one of the engagement surface 316 of the first closed member 304 (coupled with the first duct 192) and the mating surface 368 complementarily receive the other of the engagement surface 316 and the mating surface 368. In the exemplary embodiment, as shown in FIG. 6, the first duct 192 is coupled to the second duct 196 such that the first protruded portion 344' and the second protruded portion 344' (of the first closed member 304) are correspondingly received within the first groove 396' and the second groove 396", respectively (of the second closed member 308). Further, in the coupling of the first duct 192 to the second duct 196, the engagement surface 316 is received within the mating surface 368, or vice versa, such that the first closed member 304 and the second closed member 308 together define a passage 412 (shown in FIGS. 2 and 6). The passage 412 may be configured to allow at least a portion of the gas flow (e.g., the exhaust gas flow E) to pass between the second duct 196 and the first duct 192.

Also, in the coupling of the first duct 192 to the second duct 196, the engagement surface 316 is received within the mating surface 368, or vice versa, such that a labyrinth interface 416 (as shown in FIG. 6) is defined between the engagement surface 316 and the mating surface 368. The labyrinth interface 416 may define a tortuous profile 416' configured to restrict (or limit) some of the gas flow (e.g., a portion of the exhaust gas flow E flowing out of the passage 412) to seep (or escape) therethrough, thereby facilitating sealing of the first duct 192 with respect to the second duct 196.

Further, in the coupling of the first duct 192 to the second duct 196, a force exerted by the gravity (i.e., weight) may cause the first duct 192 and the second duct 196 to press together to enhance the sealing of the first duct 192 and the second duct 196 at the labyrinth interface 416. For example, the weight of the first duct 192 may cause the first axial end surface 348' and the second axial end surface 348' (of the first protruded portion 344' and the second protruded portion 344", respectively) to seat against the first bottom surface 400' and the second bottom surface 400", respectively (of the first groove 396' and the second groove 396"), thereby enhancing the sealing of the first duct 192 and the second duct 196 at the labyrinth interface 416.

Figure 7:
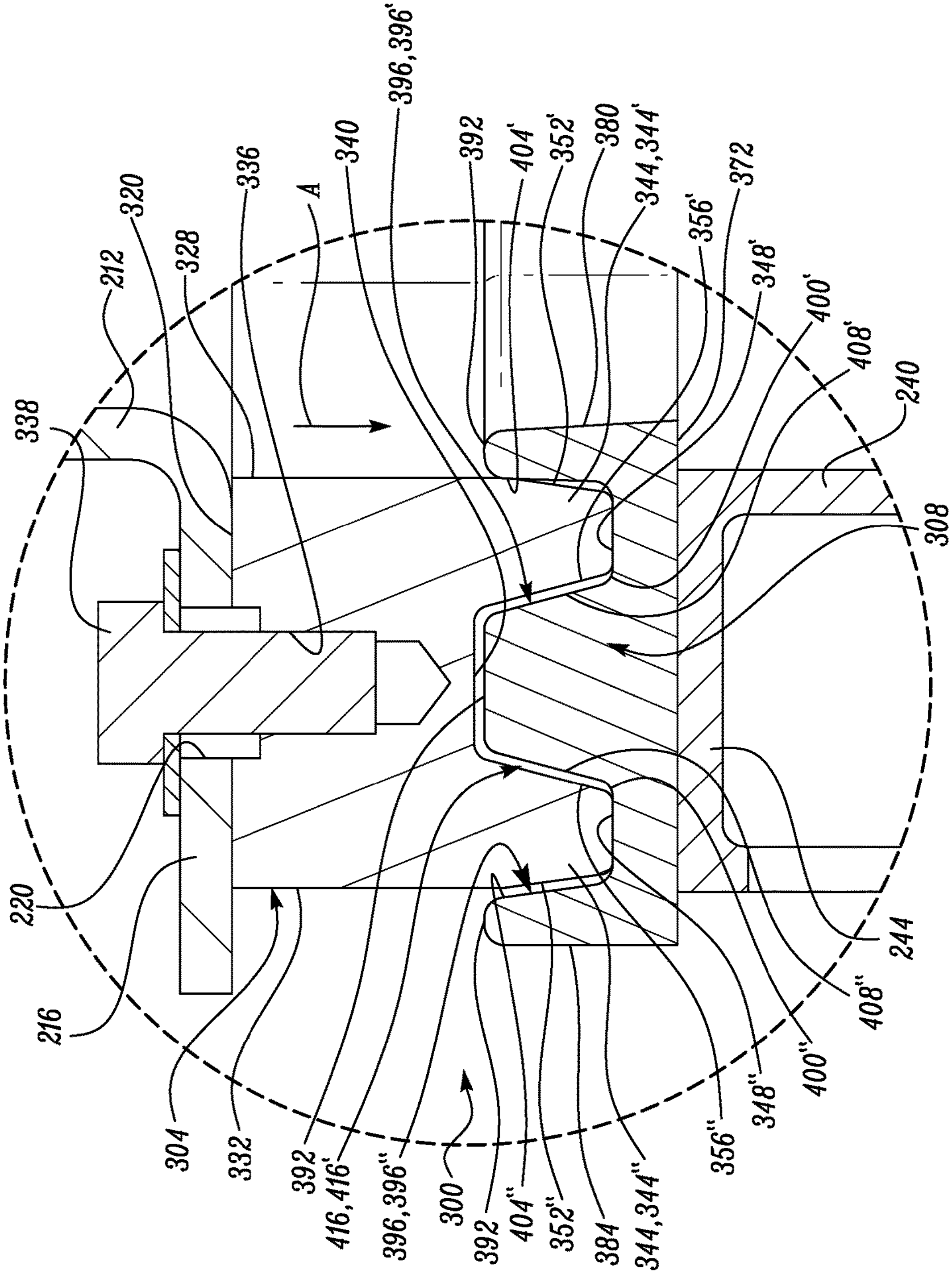

Once the first duct 192 is coupled to the second duct 196 and the gas turbine engine 112' starts operating, the gas flow (e.g., the exhaust gas flow E) passing across the passage 412 and the labyrinth interface 416 may impart a thermal load on the first sidewalls 352', 352", 356', 356' of the first protruded portion 344' and the second protruded portion 344", respectively, and on the second sidewalls 404', 404", 408', 408' of the first groove 396' and the second groove 396", respectively. The thermal load imparted on the first sidewalls 352', 352", 356', 356' and the second sidewalls 404', 404", 408', 408' may cause the first sidewalls 352', 352", 356', 356' to correspondingly move towards and impinge upon their respective second sidewalls 404', 404", 408', 408". This may further enhance the sealing of the first duct 192 with respect to the second duct 196 at the labyrinth interface 416. In the exemplary embodiment, as shown in FIG. 7, the first sidewall 352' of the first protruded portion 344' and the second sidewall 404' of the first groove 396' moves towards and impinge upon each other under the thermal load imparted by the exhaust gas flow E passing through the passage 412.

INDUSTRIAL APPLICABILITY

Power generation systems, such as the mobile power generation system 100', and a permanent (non-mobile) power generation system, may be transported to a jobsite (e.g., a remote mining site) and assembled to operate and supply electrical power to one or more power recipients (e.g., local electrical grids, devices, etc.). Also, once the operation of supplying the electrical power is finished, the mobile power generation system 100' may be disassembled for transportation. Such assembling (or disassembling) of the mobile power generation system 100' may include coupling (or decoupling) a duct (such as the first duct 192) to or from the other duct (such as the second duct 196), or other devices (e.g., the exhaust silencer unit 184). However, coupling (or decoupling) of the two ducts (or a duct and a device), generally, requires a large number of bolts (typically hundred bolts) to be fastened (or unfastened) to (or from) abutting ends of the two ducts (or the duct and the device). This may make the coupling (or decoupling) of the two ducts (or the duct and the device) a tedious and time-consuming task. In this regard, the present disclosure provides the system 300 to couple (or decouple) the two ducts (or a duct and a device) of the mobile power generation system.

An exemplary method of coupling the first duct 192 to the second duct 196, via the system 300 is now discussed. Initially, the first closed member 304 may be fixedly coupled to the first duct 192. For that, the first base surface 320 of the first closed member 304 may be abutted against the first flange portion 216 (located at the inlet end 204 of the first duct 192) such that the blind-holes 336 (of the first closed member 304) are aligned with their corresponding mounting-bores 220 (of the first flange portion 216). Subsequently, the fasteners 338 may be fastened or bolted within the corresponding blind-holes 336 and the mounting-bores 220 to couple the first closed member 304 to the first duct 192.

Additionally, the second closed member 308 may be fixedly coupled to the second duct 196. For that, the second base surface 372 of the second closed member 308 may be abutted against the second flange portion 244 (located at the outlet end 236 of the second duct 196) and welded to the second flange portion 244 to fixedly couple the second closed member 308 to the second duct 196. It should be noted that the first closed member 304 and the second closed member 308 may be coupled to the first duct 192 and the second duct 196, respectively, at any offsite location (e.g., manufacturing facility) before the mobile power generation system 100' is transported to the jobsite.

Next, the first duct 192 (along with the first closed member 304) may be positioned at an elevation above the second duct 196 (along with the second closed member 308) such that the first closed member 304 and the second closed member 308 face towards each other. In addition, the first duct 192 may be positioned above the second duct 196 such that the protruded portions 344 (i.e., the first protruded portion 344' and the second protruded portion 344') of the first closed member 304 are aligned with the corresponding grooves 396 (i.e., the first groove 396' and the second groove 396") of the second closed member 308.

Further, the first duct 192 may be moved towards the second duct 196 (e.g., along a direction 'A', as shown in FIG. 6) to engage the engagement surface 316 of the first closed member 304 with the mating surface 368 of the second closed member 308 and define the labyrinth interface 416 therebetween. For example, the first duct 192 may be moved towards the second duct 196 such that the first and second protruded portions 344', 344' (of the first closed member 304) are slidably received (under the force exerted by the gravity on the first duct 192) within the first and second grooves 396', 396", respectively (of the second closed member 308). The movement of the first duct 192 towards the second duct 196 may be restricted once the first and second axial end surfaces 348', 348' (of the first and second protruded portions 344', 344', respectively) are seated against the first and second bottom surfaces 400', 400' (of the first and second grooves 396', 396", respectively). In this manner, the first duct 192 is coupled to the second duct 196.

Once the first duct 192 is coupled to the second duct 196, the gas flow (e.g., the exhaust gas flow E) passing across the passage 412 and the labyrinth interface 416 (when operating the gas turbine engine 112') may impart a thermal load on the first sidewalls 352', 352', 356', 356' of the first protruded portion 344' and the second protruded portion 344', respectively, and on the second sidewalls 404', 404', 408', 408' of the first groove 396' and the second groove 396", respectively. This may cause the first sidewalls 352', 352", 356', 356" to correspondingly move towards and impinge upon their respective second sidewalls 404', 404', 408', 408". This may enhance the sealing of the first duct 192 with respect to the second duct 196 at the labyrinth interface 416.

The system 300 may be used to couple one or more ducts together (or to other devices). The system 300 offers the operators/supervisors the flexibility to easily and reliably, couple and/or de-couple ducts (such as the first duct 192 and the second duct 196 of the exhaust duct assembly 180), as and when needed. Since the first closed member 304 and the second closed member 308 may be coupled to the first duct 192 and the second duct 196, respectfully, at any offsite location (such as a manufacturing facility) before a mobile power generation system is transported to the jobsite, the system 300 provides plug-and-play functionality to further enhance onsite operational comfort, productivity, and work efficiency. The system 300 is equally applicable to non-mobile, permanently-installed, power generation systems.

Although the system 300 for coupling one or more ducts together is discussed in context of the power generation system (such as the power generation system 100), it should be appreciated that the system 300 may be used to couple any two ducts or tubular structures together of any known system/device/assembly, such as HVAC (Heating, Ventilation and Air Conditioning) system.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the system, the duct assembly, and the power generation system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A system for coupling a first duct to a second duct, the second duct configured for a gas flow with a gas turbine engine, the system comprising:

a first closed member configured to be fixedly coupled to the first duct, the first closed member defining an engagement surface, wherein the first closed member includes a body defining a first surface, the engagement surface being defined by the first surface and one or more annular protruded portions extending outwardly from the first surface, and wherein the one or more annular protruded portions extend throughout an annular path defined by the first closed member and each annular protruded portion of the one or more annular protruded portions defines a pair of first sidewalls;

a second closed member configured to be fixedly coupled to the second duct, the second closed member defining a mating surface complementary to the engagement surface, wherein the pair of first sidewalls of at least one annular protruded portion of the one or more annular protruded portions are tapered and converge towards each other to facilitate alignment of the engagement surface of the first closed member with the mating surface of the second closed member, and the coupling of the first duct to the second duct includes one of the engagement surface and the mating surface complementarily receiving the other of the engagement surface and the mating surface such that a labyrinth interface is defined therebetween and such that the first closed member and the second closed member together define a passage for at least a portion of the gas flow to pass between the second duct and the first duct, and at least in part, the first duct is sealed with respect to the second duct at the labyrinth interface such that a seepage of some of the gas flow out of the passage through the labyrinth interface is restricted.

2. The system of claim 1, wherein the coupling of the first duct to the second duct is such that a force exerted by gravity causes the first duct and the second duct to press together to enhance a sealing of the first duct and the second duct at the labyrinth interface.

3. The system of claim 1, wherein the second closed member includes a body defining a second surface, the mating surface being defined by the second surface and one or more annular grooves extending inwardly from the second surface into the body of the second closed member, and wherein the one or more annular grooves are defined throughout an annular path defined by the second closed member to be complementary with the one or more protruded portions of the first closed member.

4. The system of claim 3, wherein each annular groove of the one or more annular grooves defines a pair of second sidewalls, and wherein one or more of the pair of first sidewalls of the one or more annular protruded portions and one or more second sidewalls of the corresponding one or more annular grooves are configured to move towards and impinge upon each other under a thermal load resulting from the gas flow passing across the labyrinth interface to enhance a sealing of the first duct with respect to the second duct at the labyrinth interface.

5. The system of claim 4, wherein the pair of second sidewalls of at least one annular groove of the one or more annular grooves are tapered and converge towards each other to facilitate alignment of the engagement surface of the first closed member with the mating surface of the second closed member.

6. A duct assembly for a gas turbine engine, the duct assembly comprising:

a first duct;

a second duct configured for gas flow with the gas turbine engine; and a system for coupling the first duct to the second duct, the system including:

a first closed member configured to be fixedly coupled to the first duct, the first closed member defining an engagement surface; and a second closed member configured to be fixedly coupled to the second duct, the second closed member defining a mating surface complementary to the engagement surface, wherein the second closed member includes a body defining a second surface, the mating surface being defined by the second surface and one or more annular grooves extending inwardly from the second surface into the body of the second closed member, and wherein the one or more annular grooves extend throughout an annular path defined by the second closed member and each annular groove of the one or more annular groves defines a pair of first sidewalls, and the pair of first sidewalls of at least one annular protruded portion of the one or more annular protruded portions are tapered and converge towards each other to facilitate alignment of the engagement surface of the first closed member with the mating surface of the second closed member;

wherein the coupling of the first duct to the second duct includes one of the engagement surface and the mating surface complementarily receiving the other of the engagement surface and the mating surface such that a labyrinth interface is defined therebetween and such that the first closed member and the second closed member together define a passage for at least a portion of the gas flow to pass between the second duct and the first duct, and at least in part, the first duct is sealed with respect to the second duct at the labyrinth interface such that a seepage of some of the gas flow out of the passage through the labyrinth interface is restricted.

7. The duct assembly of claim 6, wherein the coupling of the first duct to the second duct is such that a force exerted by gravity causes the first duct and the second duct to press together to enhance a sealing of the first duct and the second duct at the labyrinth interface.

8. The duct assembly of claim 6, wherein the first closed member includes a body defining a first surface, the engagement surface being defined by the first surface and one or more annular protruded portions extending outwardly from the first surface, and wherein the one or more annular protruded portions are defined throughout an annular path defined by the first closed member to be complementary with the one or more annular grooves of the second closed member.

9. The duct assembly of claim 8, wherein each annular protruded portion of the one or more annular protruded portions defines a pair of second sidewalls, and wherein one or more of the pair of second sidewalls of the one or more annular protruded portions and one or more of the pair of first sidewalls of the corresponding one or more annular grooves are configured to move towards and impinge upon each other under a thermal load resulting from the gas flow passing across the labyrinth interface to enhance a sealing of the first duct with respect to the second duct at the labyrinth interface.

10. The duct assembly of claim 9, wherein the pair of first sidewalls of at least one annular protruded portion of the one or more annular protruded portions are tapered and converge towards each other to facilitate alignment of the engagement surface of the first closed member with the mating surface of the second closed member.

11. A system for coupling a first duct to a second duct, the second duct configured for a gas flow with a gas turbine engine, the system comprising:

a first closed member configured to be fixedly coupled to the first duct, the first closed member defining an engagement surface, wherein the first closed member includes a body defining a first surface, the engagement surface being defined by the first surface and one or more annular protruded portions extending outwardly from the first surface, and wherein the one or more annular protruded portions extend throughout an annular path defined by the first closed member;

a second closed member configured to be fixedly coupled to the second duct, the second closed member defining a mating surface complementary to the engagement surface, wherein the second closed member includes a body defining a second surface, the mating surface being defined by the second surface and one or more annular grooves extending inwardly from the second surface into the body of the second closed member, and wherein the one or more annular grooves are defined throughout an annular path defined by the second closed member to be complementary with the one or more protruded portions of the first closed member and each annular groove protruded portion of the one or more annular grooves defines a pair of first sidewalls;

wherein the pair of first sidewalls of at the least one or more annular grooves are tapered and converge towards each other to facilitate alignment of the mating surface of the second closed member with the engagement surface of the first closed member, and the coupling of the first duct to the second duct includes one of the engagement surface and the mating surface complementarily receiving the other of the engagement surface and the mating surface such that a labyrinth interface is defined therebetween and such that the first closed member and the second closed member together define a passage for at least a portion of the gas flow to pass between the second duct and the first duct, and at least in part, the first duct is sealed with respect to the second duct at the labyrinth interface such that a seepage of some of the gas flow out of the passage through the labyrinth interface is restricted.

12. The system of claim 11 further comprising:

a generator configured to generate electrical power; and the gas turbine engine configured to drive the generator for generating the electrical power.

13. The system of claim 12, wherein the coupling of the first duct to the second duct is such that a force exerted by gravity causes the first duct and the second duct to press together to enhance a sealing of the first duct and the second duct at the labyrinth interface.

14. The system of claim 12, wherein one or more of the pair of the pair of first sidewalls of the one or more annular protruded portions are configured to move towards and impinge the one or more annular protruded portions of the first closed member under a thermal load resulting from the gas flow passing across the labyrinth interface to enhance a sealing of the first duct with respect to the second duct at the labyrinth interface.

15. The power generation system of claim 14, wherein each annular protruded portion of the one or more annular protruded portions of the first closed member defines a pair of second sidewalls, the pair of second sidewalls of at least one annular protruded portion of the one or more annular protruded portions are tapered and converge towards each other and to facilitate alignment of the engagement surface of the first closed member with the mating surface of the second closed member.

* * * * *